Patented June 23, 1953

2,643,215

UNITED STATES PATENT OFFICE 2,643,215

TREATMENT AND USE OF POROUS CONTACT MASSES

Albert Wesley Hoge, Ridley Park, Pa., assignor to Houdry Process Corporation, Wilmington, Del., a corporation of Delaware No Drawing. Application March 1, 1947, Serial No. 731,870

5 Claims. (Cl. 196—52)

This invention relates to processes involving the treatment and use of particulate contact masses which have high porosity and active surfaces and is especially concerned with solid porous catalysts such as refractory cracking catalysts.

Many heterogeneous catalytic processes that involve the contact of fluids with surface active solids are more efficient when the surface active solid is a highly porous contact mass. In practice, these contact masses are frequently subjected to operations at high temperatures, such as regenerations or calcinations above 1000° F., which decrease their specific surface and catalytic activity. For example, in the catalytic conversion of hydrocarbons under cracking conditions using solid refractory catalysts, hereinafter referred to as catalytic cracking, the original hydrocarbons are converted to hydrocarbons of different molecular weight or structure or both in the presence of a contact mass comprising a cracking catalyst. The catalyst is generally a porous refractory solid having catalytic cracking activity such as an active or activated clay (for example, of the montmorillonite type) or a synthetically produced porous silicious contact mass, for example, silica-alumina, silica-alumina-zirconia, silica-magnesia and the like. During the catalytic cracking operation, the cracking catalyst, which directs and accelerates the hydrocarbon conversion reaction, concomitantly accumulates a deposit of hydrocarbonaceous material commonly referred to as coke. Since the deposit of coke diminishes the efficiency of the catalyst, the catalyst is periodically regenerated by contacting it with an oxidizing gas. After regeneration of at least a portion of the coke deposit, the catalyst is suitable for reuse and the cycle of operations is repeated.

In regeneration procedures commonly used, the temperature of the catalyst increases markedly during the regeneration. Commercial operations are generally effected under conditions, such as by the use of indirect heat exchange, so as to restrict the maximum temperatures of regeneration to about 1100° F. However, in spite of precautions, the activity of catalysts used in either fixed bed or moving catalyst systems gradually (and sometimes rapidly) decreases. In fixed bed systems, the catalyst is replaced when it has declined to an uneconomical level of catalytic activity while it is common practice in the operation of moving catalyst systems to withdraw a small portion of the total catalyst in the system and continuously or at intervals replace the material withdrawn with fresh catalyst.

I have observed that the decline in catalytic activity of a catalyst, such as a cracking catalyst, is generally accompanied by an increase in the density or a decrease in the porosity of such a catalyst or both, and that the particles of a catalytic contact mass which has been subjected to temperatures above about 1000° F., such as by regeneration during use in a catalyst cracking system, are non-uniform in regard to catalytic activity and various physical properties such as density, porosity, specific surface and the like.

It has now been found that when contact masses comprising particles of cracking catalyst are subjected to repeated cycles of operation including cracking, regeneration, and purging periods such as is encountered in commercial cracking systems, the catalytic activity and density of the particles are related in a definite manner for each such system, the density increasing as the catalytic activity decreases. This relationship is particularly simple in the higher range of densities and lower range of acitivities, and is thought to result from aging due to the particular operating conditions encountered. The relationship may be simple in many cases because many commercial catalysts which are charged to commercial systems such as moving bed systems have been previously treated so as to be at or near the breakpoint (i. e., point at which further increase in density causes a marked decrease in activity). In any event, when a contact mass which has been used in a catalytic cracking system and which comprises a mixture of fresh and used catalyst, is as disclosed and claimed in my co-pending application, Serial No. 723,365, filed January 21, 1947, now U. S. Patent No. 2,567,207, subjected to separation so as to remove a fraction having an average bulk density higher than the contact mass, and preferably at least 15 per cent higher than the density of the fresh catalyst, the remainder of the contact mass has an improved activity.

In accordance with the present invention, contact masses of high catalytic activity in the conversion of organic compounds such as the cracking of hydrocarbons are obtained from contact masses of lower average catalytic activity, which contact masses of lower average catalytic activity comprise particles of different catalytic activity characterized by different densities or porosities or both, by stratifying such a contact mass of lower average catalytic activity into a relatively more catalytically active fraction and a relatively less catalytically active fraction by a flotation of the particles of one of said fractions in a liquid having a density selected to allow the particles of the other fraction to sink. The relatively more catalytically active fraction so obtained may thereafter be used in catalytic conversion processes at an increased level of catalytic activity. By the methods described herein, a contact mass composed of particles having the same basic composition (with the exception of volatile material) but differing in porosity or density or both, may be separated into fractions according to catalytic activity without regard to particle size. The separation may be operated in conjunction with a process in which relatively less active particles are continuously produced or it may be used to improve the catalytic efficiency of a contact mass prior to use in a catalytic conversion process.

It has now been found that, although the relatively less active particles of a hydrocarbon conversion catalyst, such as a cracking catalyst, have a much lower porosity and specific surface than do the relatively more active particles, and are more dense when the density is measured in bulk or on the basis of particle density (where particle density has its usual meaning of apparent particle density, being the weight of a particle in air divided by its volume, including those voids in the particles accessible to penetration by water), the less catalytically active particles are less dense than the relatively more active particles when the density is measured by methods which generally yield the true density of a porous material (where true density has its usual meaning, being the weight of a particle in air divided by the volume of the particle not accessible to penetration by water).

Thus, when, in accordance with the present invention, a contact mass comprising porous, solid, catalytically active particles of differing porosity or density or both and differing catalytic activity, is stratified into a relatively more catalytically active fraction and a relatively less catalytically active fraction by introducing said contact mass into a body of liquid having a density adapted or selected to float only a fraction of said particles, whereby the fraction consisting of the remainder of said particles sinks in said body of liquid, and the more catalytically active of said fractions is separated from said body of liquid apart from the other of said fractions, the relative position of the two fractions will depend on whether or not the particles are sealed to impregnation by the liquid used for stratification. In one embodiment of the invention, a catalytically active contact mass comprising particles of different porosity and catalytic activity may be separated by an operation in which the liquid used for the stratification is allowed to impregnate the particles. When the contact mass so impregnated stratifies, it is the relatively less catalytically active particles (which have a relatively higher bulk density) which float while the relatively more catalytically active particles (which have a relatively lower bulk density) sink. If, however, as in another embodiment, the particles of the contact mass are first sealed, as by impregnation of the particles with a liquid immiscible with the liquid used for separation, the subsequent stratification occurs in the reverse sense (i. e., the relatively more catalytically active particles float).

In a preferred embodiment of my invention involving moving catalyst systems, I continuously withdraw from the main body of the contact mass circulating within the catalytic cracking system a portion thereof, and separate from the withdrawn contact mass by the methods herein described a relatively low activity fraction. Since the remainder of contact mass after removal of a relatively low activity fraction has a catalytic efficiency higher than the main body of contact mass to which it is returned, it serves to increase the catalytic efficiency of the main body of contact mass. At the same time, I may add fresh relatively high activity catalyst to the main body of contact mass and thus obtain the twofold effect of further enhancing the catalytic efficiency of the main body of catalyst and, where it is desirable, maintaining the volume of the main body of the catalyst substantially constant by such an addition. By operating the above described process continuously, I may maintain the main body of contact mass at a high level of cracking efficiency with a minimum amount of added catalyst, despite a gradual deterioration of the catalyst as a result of continued use. The cracking catalyst may be withdrawn from any desired point in the system, the catalyst cooled and separated into fractions as herein described and the relatively more catalytically active fraction returned to the cracking system. The relative amount of catalyst withdrawn from the main body of catalyst circulating in a fluent or moving catalyst cracking system will depend on the rate at which the catalyst deteriorates under the existing operating conditions and on the desired level of equilibrium activity. Although it is generally preferred to withdraw a portion of catalyst continuously, it may, at times, be desirable to operate the process intermittently or to withdraw a larger portion continuously for a short time.

In one embodiment of the invention, a contact mass comprising particles differing in catalytic activity and in porosity and/or density is separated by stratifying the contact mass into two fractions by the use of a liquid of selected density, the individual particles of the contact mass being susceptible to impregnation by the liquid used for stratification. The liquid used for stratification is selected or blended so that it has a density intermediate to the true densities (measured as described above) of the particles to be separated. Various liquids may be used; as, for example, separation of particles of a commercial cracking catalyst derived from a bentonitic clay and having a range of true density between 2.0 and 2.8 grams per cubic centimeter (hereinafter abbreviated as gm./cc.) may be effected using various organic or inorganic halides of high density mixed with an inert lower density liquid. Satisfactory high density liquids are antimony tri- or pentachloride, silicon tetrabromide, thionylbromide, ethylene tribromide, difluorodibromoethanes, and the like. Such a high density liquid may be used alone when suitable or may be diluted with any lower density non-reactive miscible liquid, such as hydrocarbons, alcohols, esters and the like, to produce a liquid of a density in the range of 2.0 to 2.8 gm./cc. and preferably at least 0.01 gm./cc. higher in density than the fraction which is to be floated. After separation of the two fractions of contact mass following stratification, the liquid occluded in the particles of the contact mass may be recovered, as by volatilization, washing with a solvent, centrifuging and similar methods, and the recovered liquid reused for further processing of additional contact mass.

In another embodiment of the invention, the particles of the contact mass are sealed prior to stratification in a liquid of selected density. Such an operation has the advantage that the liquid used for stratification can be a liquid which, if allowed to impregnate the catalyst particle, would cause a subsequent loss in catalytic activity. Since the density of the sealed particle, including the sealing material, is less than the true density of the particle when a liquid having a density less than the true density of the particle is used, the liquid used for stratification can have a lower density under such conditions than if it is allowed to impregnate the particle. The particle may be sealed prior to stratification by impregnating it with a liquid which is immiscible with the liquid used for stratification and which preferably has a density of about 1.0 gm./cc. or lower. Alternatively, the particle may be sealed by immersion in a melted solid, such as wax or asphalt, or in a solution of a film forming solid, such as a solution of a plastic in a volatile solvent, so that the surface of the particle is sealed sufficiently to prevent impregnation by the liquid used for stratification. In this method, complete impregnation of the particle by the sealing liquid is not essential and certain advantages, such as the use of a liquid having a lower density for stratification, accrues when only the surface portion of the particle is impregnated so that the surface is effectively sealed. The material used for sealing the surface of the particle is preferably relatively insoluble in the liquid used for stratification under the conditions of operation. Thus, the particles of the contact mass may be impregnated with water and the contact mass thereafter stratified using a liquid comprising one or more halogenated hydrocarbons, or the particles may be impregnated with a petroleum fraction and the contact mass stratified using an aqueous solution or an inorganic liquid. Various liquids, which, for the commercial clay cracking catalyst mentioned above, should range in density from about 1.6 to 2.0 gm./cc., may be used for stratification, such as acids and solutions of acids, for example, sulfuric or phosphoric acids, solutions of organic or inorganic salts of metals, low melting mixtures of inorganic salts, solutions of halogenated organic water soluble compounds and the like. After stratification and separation of the fractions the sealing material may be removed by any suitable means such as votilization, solution or, where the sealing material is combustible, by contact with an oxidizing gas under combustion conditions as by charging the particles of catalyst to the regeneration zone of a cracking system. Alternatively, the particle of catalyst may be impregnated with a liquid or a solution which, in subsequent processing, results in a catalytically active layer on the particles.

After stratification, the separation of the relatively more catalytically active fraction from the relatively less catalytically active fraction may be accomplished by known methods for the recovery of solids separated by flotation. Thus, I may effect the stratification batchwise, as in a tank from which the floating particles are carried in an overflow of liquid, or may use a continuous system and remove the separated fractions by conveyor screens. After such a separation, the relatively more catalytically active fraction is reused as a catalytic contact mass while the relatively less catalytically active fraction is either discarded or used in a process where its catalytic activity is suitable, as, for example, where a cracking catalyst is involved in vis-breaking a charge stock in preparation for catalytic cracking to gasoline.

Various catalysts may be processed in conjunction with the present invention, the criterion of use in connection therewith being that the contact mass comprise particles differing in porosity and/or density (as measured in terms of bulk or true density) and that the catalytic activity of the particles be related to the density and/or porosity. Such differences may be caused by variation in the conditions used in the preparation or activation of the contact mass or may have originated during the course of use as by variations during the regeneration operation. It has been found, as hereafter shown, that some catalytic contact masses, such as some cracking catalysts, can be subjected to treatments which change the density without substantially decreasing the activity (in some cases, even increasing it). However, as the catalyst is subjected to increasingly severe conditions, a breakpoint (which may be a limited range of values rather than a single value) is reached and thereafter the catalytic activity declines rapidly as the density increases. Other types of treatment which increase the density, particularly those involving the presence of steam, tend to decrease the activity as soon as the density increases and the phenomenon of the breakpoint is generally absent. Whether or not the phenomenon of the breakpoint is present, after the catalytic activity has declined about 10 to 15%, the relationship between the catalytic activity and the density is generally simple and definite in the lower range of activities (less than 75% of the maximum activity) and in the corresponding upper range of densities under similar aging or operating conditions. The invention includes within its scope, the processing of other materials which exhibit similar but numerically different ranges.

The following tables illustrate the effects discussed above, the catalytic activity being expressed therein as the volume percentage of gasoline (referred to the volume of charge stock) produced by cracking a standardized charge stock under standardized cracking conditions (for details of this test, known as the "CAT-A" test, see "Laboratory method for determining the activity of cracking catalysts" by J. Alexander and H. E. Shimp, page R-537, National Petroleum News, August 2, 1944). The data shown in these tables were obtained by subjecting samples of catalysts of the types indicated to accelerated aging tests, the temperatures involved being above 1000° F. In each case, the tests of each series (A, B, etc.) were conducted under comparable conditions, the severity of the test increasing (as by raising the temperature) as the test number increases (series F being smoothed data from a number of different runs).

TABLE I

*Synthetic silica-alumina catalyst*

| | Molded Pellets | | | | | Gel Beads | | |
|---|---|---|---|---|---|---|---|---|
| Test No. | Bulk Density, Kilo. Per Liter | Activity, Percent Gasoline | Test No. | Bulk Density, Kilo. Per Liter | Activity, Percent Gasoline | Test No. | Bulk Density, Kilo. Per Liter | Activity, Percent Gasoline |
| A-1 | 0.49 | 47.0 | B-1 | 0.53 | 45.7 | C-1 | 0.72 | 45.3 |
| A-2 | 0.57 | 46.8 | B-2 | 0.66 | 38.0 | C-2 | 0.76 | 36.0 |
| A-3 | 0.69 | 45.6 | B-3 | 0.87 | 25.0 | C-3 | 0.85 | 26.5 |
| A-4 | 0.85 | 35.6 | | | | C-4 | 0.95 | 20.5 |
| A-5 | 0.93 | 23.1 | | | | | | |

TABLE II

*Activated clay*

| Test No. | Bulk Density, Kilo. Per Liter | Activity, Percent Gasoline | Test No. | Bulk Density, Kilo. Per Liter | Activity, Percent Gasoline | Test No. | Bulk Density, Kilo. Per Liter | Activity, Percent Gasoline |
|---|---|---|---|---|---|---|---|---|
| D-1 | 0.60 | 41.7 | E-1 | 0.70 | 42.6 | F-1 | 0.69 | 40 |
| D-2 | 0.61 | 44.5 | E-2 | 0.71 | 43.4 | F-2 | 0.74 | 35 |
| D-3 | 0.61 | 41.7 | E-3 | 0.92 | 23.4 | F-3 | 0.80 | 30 |
| D-4 | 0.74 | 32.2 | E-4 | 1.15 | 4.9 | F-4 | 0.91 | 20 |
| D-5 | 0.80 | 18.0 | | | | F-5 | 1.01 | 10 |

The synthetic silica-alumina catalysts referred to in above Table I were prepared by precipitating a colloidal mass of silica and alumina gels in an alkaline menstruum and thereafter treating the colloidal mass to remove at least part of the alkali metal ions present. The molded pellets were prepared by grinding and milling dry gel, forming it into pellets and calcining the pellets so formed. The gel beads were prepared by precipitation in that form. The activated clay catalyst referred to in Table II is a commercial form of acid activated montmorillonite clay in the form of 3 to 8 mesh pellets. The variations in the densities of the starting materials (contrast A-1 and B-1, D-1 and E-1) resulted from differences in the prior processing. In general, similar effects are observed in other contact masses synthetically produced such as coprecipitated chromia-alumina dehydrogenation catalysts and the like.

As shown by the following examples, the increase in bulk density is accompanied by a shrinkage of the particle with a concomitant decrease in porosity and decrease in true density. In order to illustrate the present invention but not to be construed as a limitation thereon, the following examples are given.

EXAMPLE I

A contact mass consisting of pellets of acid activated montmorillonite clay about 3 to 4 millimeters in diameter and about 3 to 6 millimeters in length, which pellets differed in density and catalytic activity because of the effect of high temperatures encountered in conventional catalytic cracking, was introduced into a vessel containing a solution consisting of a mixture of ethylene tribromide and carbon tetrachloride in such proportions as to produce a stratifying liquid of 2.22 gm./cc. density. The contact mass became impregnated with the liquid and stratified into a fraction which floated in the liquid and a fraction which sank. The two fractions were separated. The fraction that sank, referred to as fraction A, consisted of pellets of excellent catalytic cracking activity, producing, when freed of the stratifying liquid, in a catalytic cracking run under the conditions of the CAT-A test 43.0 volume per cent gasoline. The fraction that floated, referred to as fraction B, when used in a similar catalytic cracking run produced 11.2 volume per cent gasoline. Other properties of the fractions are given in the following table:

| | Particle Density, gm./cc. | Porosity, Volume Percent | True Density, gm./cc. |
|---|---|---|---|
| Fraction A | 1.12 | 56.5 | 2.66 |
| Fraction B | 1.69 | 23.4 | 2.20 |

EXAMPLE II

The pellets of a contact mass similar to that described in Example I were immersed in a body of a refined white mineral oil to seal the pores of the pellets. They were then introduced into a body of liquid having a density of 1.707 gm./cc., this liquid having been prepared by dissolving zinc chloride in water. The contact mass stratified into two fractions, A and B, having, when free of the sealing liquid, the properties noted above. In this case, fraction A floated and fraction B sank.

A similar process in which petroleum ether was used as the impregnating liquid gave the same results.

EXAMPLE III

The pellets of a contact mass similar to that described in Example I were sealed with water and placed in a body of liquid having a density of 1.79 gm./cc., this liquid having been prepared by mixing ethyl iodide and carbon tetrachloride. The same results as in Example II were obtained. All of the pellets sank when the density of the liquid was 1.66 gm./cc.

A similar operation using a mixture of ethylene tribromide and carbon tetrachloride gave the same results.

Obviously many modifications and variations of the invention as hereinbefore set forth may be made without departing from the spirit and scope thereof and therefore only such limitations should be imposed as are indicated in the appended claims.

I claim as my invention:

1. The process of treating a mass composed of particles of porous solid catalytically active material, said particles having the same basic composition and differing in catalytic activity, which comprises impregnating at least the surface of the particles of said mass with a sealing liquid to seal said surface to subsequent liquid penetration, introducing said mass into a body of stratifying liquid having a density adapted to float only a fraction of said particles of said mass and substantially immiscible with said sealing liquid, stratifying said mass into two fractions, the catalytic activity of the particles of one of said fractions differing from the catalytic activity of the particles of the other of said fractions, and separating the more catalytically active of said fractions from said body of stratifying liquid apart from the other of said fractions.

2. The process of treating a mass composed of particles of porous solid catalytically active material, said particles having the same basic composition and differing in catalytic activity, which comprises impregnating the particles of said mass with a sealing liquid to seal said particles to subsequent liquid penetration, introducing said mass into a body of stratifying liquid having a density adapted to float only a fraction of said particles of said mass and substantially immiscible with said sealing liquid, stratifying said mass into two fractions, the catalytic activity of the particles of one of said fractions differing from the catalytic activity of the particles of the other of said fractions, and separating the more catalytically active of said fractions from said body of startifying liquid apart from the other of said fractions.

3. In processes for the conversion of hydrocarbons using solid hydrocarbon conversion catalysts that decline in catalytic activity when subjected to repeated cycles of conversion and regeneration, the improvement which comprises effecting conversion of said hydrocarbons under conversion conditions in the presence of a relatively more catalytically active fraction of a total catalytic contact mass comprising particles of said solid conversion catalyst previously subjected to temperatures at which the activity of said catalyst decreases and comprising particles of said catalyst having the same basic composition and differing in catalytic activity, which relatively more catalytically active fraction has been obtained by impregnating the particles of said total mass with a sealing liquid to seal said particles to subsequent liquid penetration, introducing said mass into a body of liquid having a density adapted to float only a fraction of said particles, stratifying said mass into two fractions of different average particle densities, the fraction having the lesser average particle density being more catalytically active than the other of said fractions, and separating said more catalytically active fraction from said body of liquid apart from the other of said fractions.

4. A method for fractionating a mixture of porous particles into fractions containing openpored particles of substantially the same composition but of different porosities comprising the steps of introducing an impregnating liquid having a density different from the true density of the solid material composing the particles into the pores of said particels of substantially the same composition but of different porosities, and stratifying the resulting impregnated particles by a flotation liquid into a fraction which is more dense than and into a fraction which is less dense than the flotation liquid, said flotation liquid being different from the impregnating liquid and having a density adapted to float only a fraction of said particles of said mass.

5. A process for the flotation separation of porous cracking catalyst particles of substantially identical chemical composition but varying activity which comprises filling the pores of said partices with a liquid hydrocarbon, admixing said hydrocarbon filled particles with an aqueous liquid having a specific gravity numerically intermediate the maximum and minimum values for particle densities of said hydrocarbon filled particles and separately removing the portion of said particles which floats on and the portion thereof which sinks in said liquid.

ALBERT WESLEY HOGE.

References Cited in the file of this patent

UNITED STATES PATENTS

| Number | Name | Date |
|---|---|---|
| 1,294,519 | Moxham | Feb. 18, 1919 |
| 1,374,657 | Hiller | Apr. 12, 1921 |
| 1,839,117 | Nagelvoort | Dec. 29, 1931 |
| 1,871,121 | Holmes | Aug. 9, 1932 |
| 2,151,578 | Alexander et al. | Mar. 21, 1939 |
| 2,216,050 | Romberg | Sept. 24, 1940 |
| 2,253,285 | Connolly | Aug. 19, 1941 |
| 2,257,157 | Connolly | Sept. 30, 1941 |
| 2,271,318 | Thomas et al. | Jan. 27, 1942 |
| 2,272,301 | Kinneberg et al. | Feb. 10, 1942 |
| 2,296,522 | Hartley | Sept. 22, 1942 |
| 2,353,119 | Workman | July 4, 1944 |